(12) United States Patent
Meacham et al.

(10) Patent No.: US 9,488,218 B2
(45) Date of Patent: Nov. 8, 2016

(54) PILOT RING WITH CONTROLLED AXIAL ROLL

(71) Applicant: HONEYWELL INTERNATIONAL INC., Morristown, NJ (US)

(72) Inventors: Walter Andrew Meacham, Scottsdale, AZ (US); Walter Lee Meacham, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/672,797

(22) Filed: Mar. 30, 2015

(65) Prior Publication Data

US 2016/0290389 A1    Oct. 6, 2016

(51) Int. Cl.
| | |
|---|---|
| *F02C 3/06* | (2006.01) |
| *F02C 7/20* | (2006.01) |
| *F16C 17/10* | (2006.01) |
| *F01D 5/06* | (2006.01) |
| *F16C 17/26* | (2006.01) |

(52) U.S. Cl.
CPC ............ *F16C 17/10* (2013.01); *F01D 5/066* (2013.01); *F16C 17/26* (2013.01); *F05D 2220/32* (2013.01); *F05D 2240/52* (2013.01); *F05D 2240/54* (2013.01)

(58) Field of Classification Search
CPC .......... F02C 3/085; F02C 3/107; F02C 7/06; F02C 7/20; F02C 7/36; F05D 2240/52; F05D 2240/54; F05D 2240/60; F05D 2240/62; F05D 2240/90; F05D 2260/30; F01D 25/16; F01D 25/166; F01D 25/168

USPC ........... 384/215, 275, 535, 581; 60/796–799, 60/805; 416/194, 198 R
See application file for complete search history.

(56) References Cited

U.S. PATENT DOCUMENTS

| | | | | |
|---|---|---|---|---|
| 3,610,772 | A * | 10/1971 | Wagle | F01D 5/06 416/198 A |
| 5,161,945 | A * | 11/1992 | Clevenger | F02C 3/085 415/177 |
| 5,233,824 | A * | 8/1993 | Clevenger | F02C 3/085 415/174.2 |
| 5,664,413 | A | 9/1997 | Kington et al. | |
| 6,250,883 | B1 | 6/2001 | Robinson et al. | |
| 8,840,446 | B2 | 9/2014 | Chen et al. | |
| 2011/0305567 | A1 * | 12/2011 | Milfs | F16C 19/56 415/229 |

FOREIGN PATENT DOCUMENTS

| | | |
|---|---|---|
| FR | 3007788 A1 | 1/2015 |
| WO | 9207177 A1 | 4/1992 |

OTHER PUBLICATIONS

Extended EP Search Report for Application No. 16162332.7-1610/3078803 dated Sep. 14, 2016.

* cited by examiner

*Primary Examiner* — Phillip A Johnson
(74) *Attorney, Agent, or Firm* — Lorenz & Kopf, LLP

(57) ABSTRACT

Apparatuses are provided for a pilot ring. The pilot ring includes a first ring and a second ring positioned concentrically within the first ring. The second ring includes a first circumferential surface positioned adjacent to the first ring and a second circumferential surface opposite the first circumferential surface. The second circumferential surface includes at least one roll feature that extends substantially along a perimeter of the second circumferential surface.

19 Claims, 6 Drawing Sheets

PILOT RING WITH CONTROLLED AXIAL ROLL

TECHNICAL FIELD

The present disclosure generally relates to pilot rings for radial piloting of two different components, and more particularly relates to a pilot ring with controlled axial roll.

BACKGROUND

Generally, pilot rings may be used between two components, which are coupled together for rotation. The pilot ring typically performs an axial function and a radial function. The axial function refers to the transfer of axial loads between the components and the radial function refers to maintaining concentricity between the components. In instances where one of the components expands thermally at a different rate than the other component, the pilot ring may need to roll to accomplish the radial function.

Accordingly, it is desirable to provide a pilot ring with controlled axial roll to improve the axial function of the pilot ring. Furthermore, other desirable features and characteristics of the present invention will become apparent from the subsequent detailed description and the appended claims, taken in conjunction with the accompanying drawings and the foregoing technical field and background.

SUMMARY

According to various embodiments, a pilot ring is provided. The pilot ring includes a first ring and a second ring positioned concentrically within the first ring. The second ring includes a first circumferential surface positioned adjacent to the first ring and a second circumferential surface opposite the first circumferential surface. The second circumferential surface includes at least one roll feature that extends substantially along a perimeter of the second circumferential surface.

Provided according to various embodiment is a pilot ring. The pilot ring includes a first ring and a second ring positioned within the first ring. The second ring is spaced apart from the first ring to define a clearance gap. The second ring includes a first side spaced apart from the first ring by the clearance gap and a second side opposite the first side. The first side is coupled to the second side by a third side and a fourth side. The third side and the fourth side each including a planar surface and an inclined surface such that the second ring is symmetrical relative to a central axis defined through the pilot ring. The second side includes at least one roll feature that extends radially inward from the third side.

Also provided according to various embodiments is a gas turbine engine. The gas turbine engine comprises a first component having a first flange and a second component coupled to the first component to rotate with the first component. The second component includes a second flange. The gas turbine engine also includes a pilot ring coupled to the first flange and the second flange. The pilot ring includes a first ring spaced apart from a second ring. The first ring is to transfer axial loads between the first component and the second component. The second ring includes a first roll feature and a second roll feature defined on a first circumferential surface of the second ring. The first roll feature and the second roll feature extend radially inward from the first circumferential surface. The first roll feature is coupled to the first flange of the first component and the second roll feature is coupled to the second flange of the second component to provide radial piloting of the first component and the second component.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of adjacent rotating components, and that the example of the compressor and turbine described herein is merely one exemplary embodiment of the present disclosure. It should be noted that many alternative or additional functional relationships or physical connections may be present in an embodiment of the present disclosure.

Figure 1:
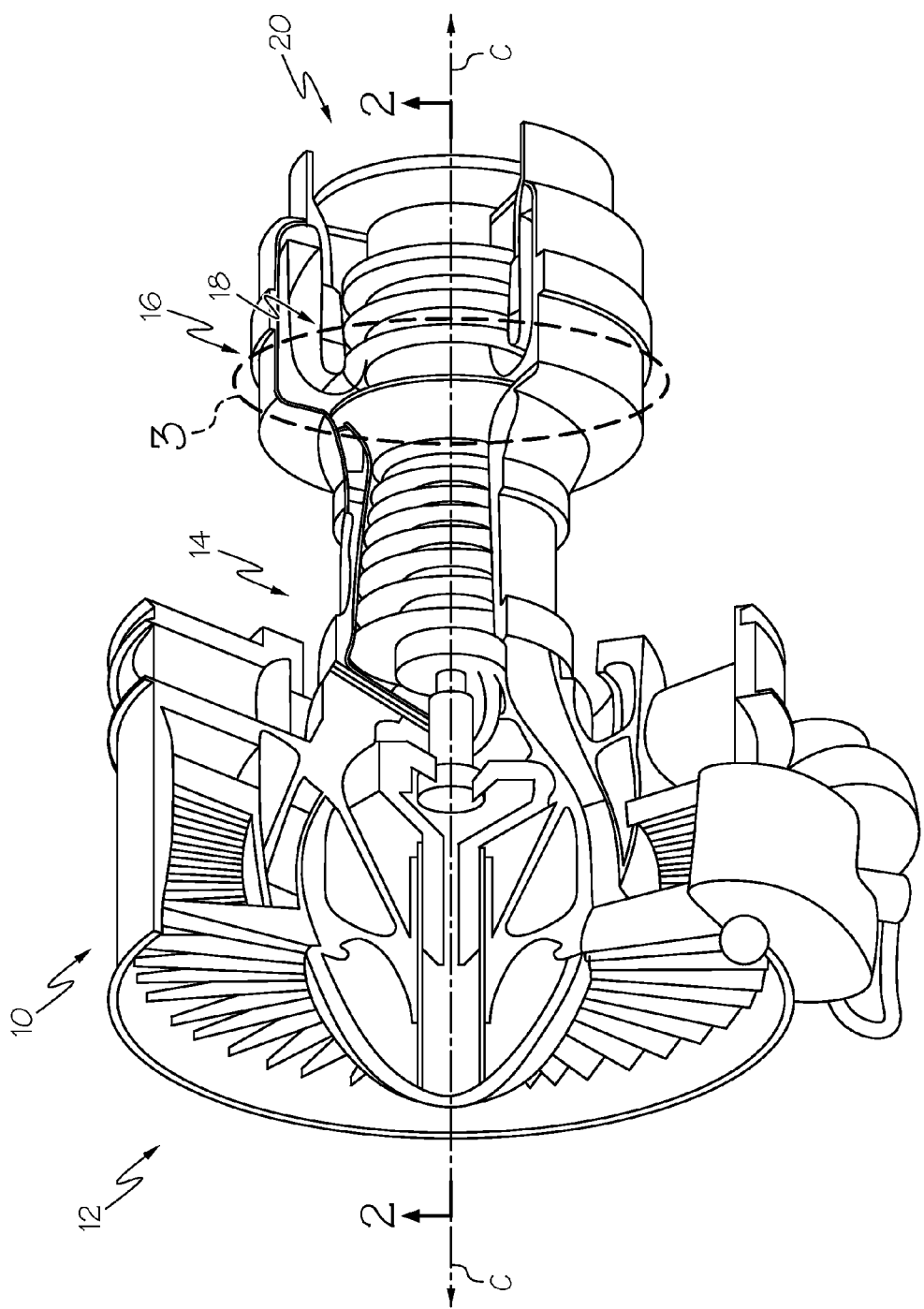
FIG. 1 is a schematic partially cut-away illustration of a gas turbine engine that includes a pilot ring with controlled axial roll in accordance with various embodiments.
Figure 2:
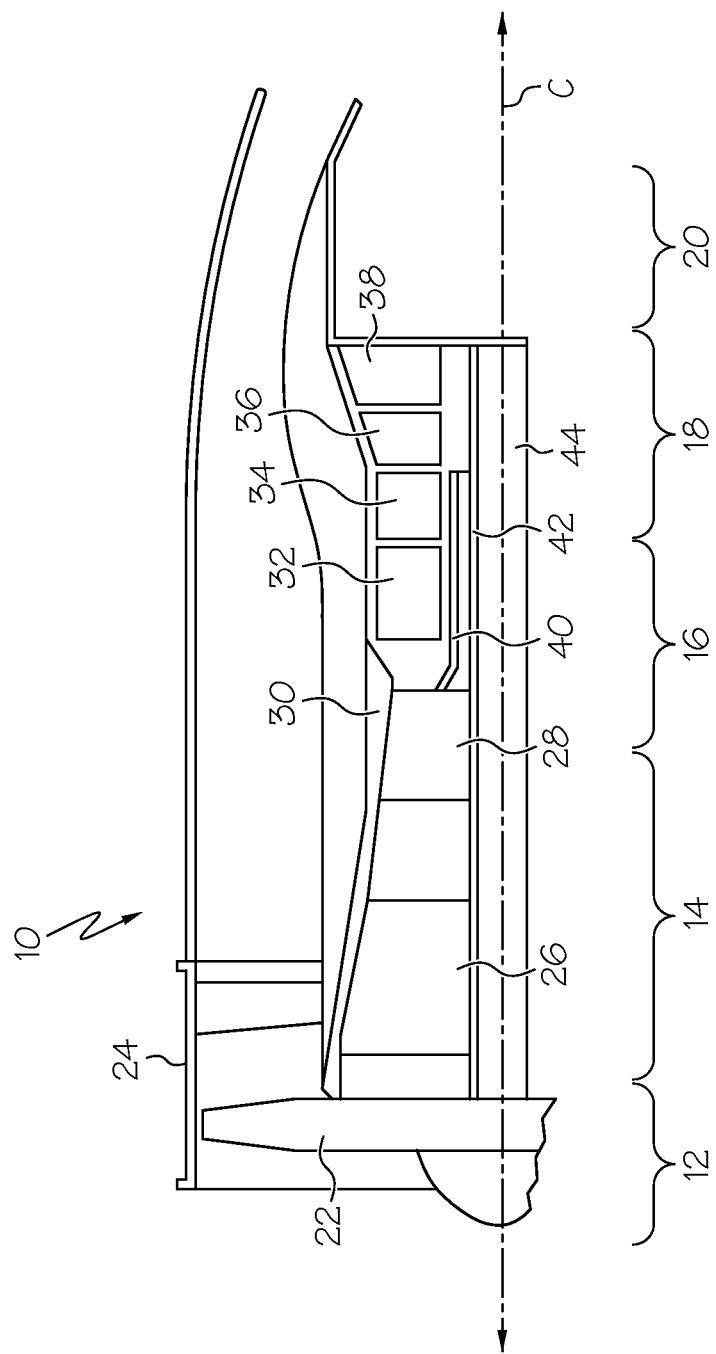
FIG. 2 is a schematic cross-sectional illustration of the gas turbine engine of FIG. 1, taken along line 2-2 of FIG. 1.

With reference to FIGS. 1 and 2, an exemplary gas turbine engine 10 is shown, which includes a pilot ring with a controlled axial roll according to various embodiments. It should be noted that the use of the pilot ring with the gas turbine engine 10 is merely exemplary, as the pilot ring described and illustrated herein can be employed between any suitable rotating components to provide radial and axial piloting. In this example, the gas turbine engine 10 includes a fan section 12, a compressor section 14, a combustion section 16, a turbine section 18, and an exhaust section 20. It should be noted that although the figures shown herein depict an example with certain arrangements of elements, additional intervening elements, devices, features, or components may be present in an actual embodiment. It should also be understood that the figures are merely illustrative and may not be drawn to scale.

With reference to FIG. 2, the fan section 12 includes a fan 22 mounted in a fan casing 24. The fan 22 induces air from the surrounding environment into the engine and passes a fraction of this air toward the compressor section 14. The compressor section 14 includes at least one compressor and, in this example, includes a low-pressure (LP) compressor 26 (may also be referred to as an intermediate-pressure (IP) compressor) and a high-pressure (HP) compressor 28. The LP compressor 26 raises the pressure of the air directed into it from the fan 22 and directs the compressed air into the HP compressor 28. The LP compressor 26 and the HP compressor 28 may be axi-symmetrical about a longitudinal centerline axis C. The LP compressor 26 and the HP compressor 28 are mounted in a compressor casing 30 (hereinafter referred to as a shroud 30).

Still referring to FIG. 2, the combustion section 16 of gas turbine engine 10 includes a combustor 32 in which the high pressure air from the HP compressor 28 is mixed with fuel and combusted to generate a combustion mixture of air and fuel. The combustion mixture is then directed into the turbine section 18. The turbine section 18 includes a number of turbines disposed in axial flow series. FIG. 2 depicts a high pressure turbine 34, an intermediate pressure turbine 36, and a low pressure turbine 38. While three turbines are depicted, it is to be understood that any number of turbines may be included according to design specifics. For example, a propulsion gas turbine engine may comprise only a high pressure turbine and a low pressure turbine. The combustion mixture from the combustion section 16 expands through each turbine 34, 36, 38, causing them to rotate. As the turbines 34, 36, 38 rotate, each respectively drives equipment in the gas turbine engine 10 via concentrically disposed spools or shafts 40, 42, 44. The combustion mixture is then exhausted through the exhaust section 20.

Figure 3:
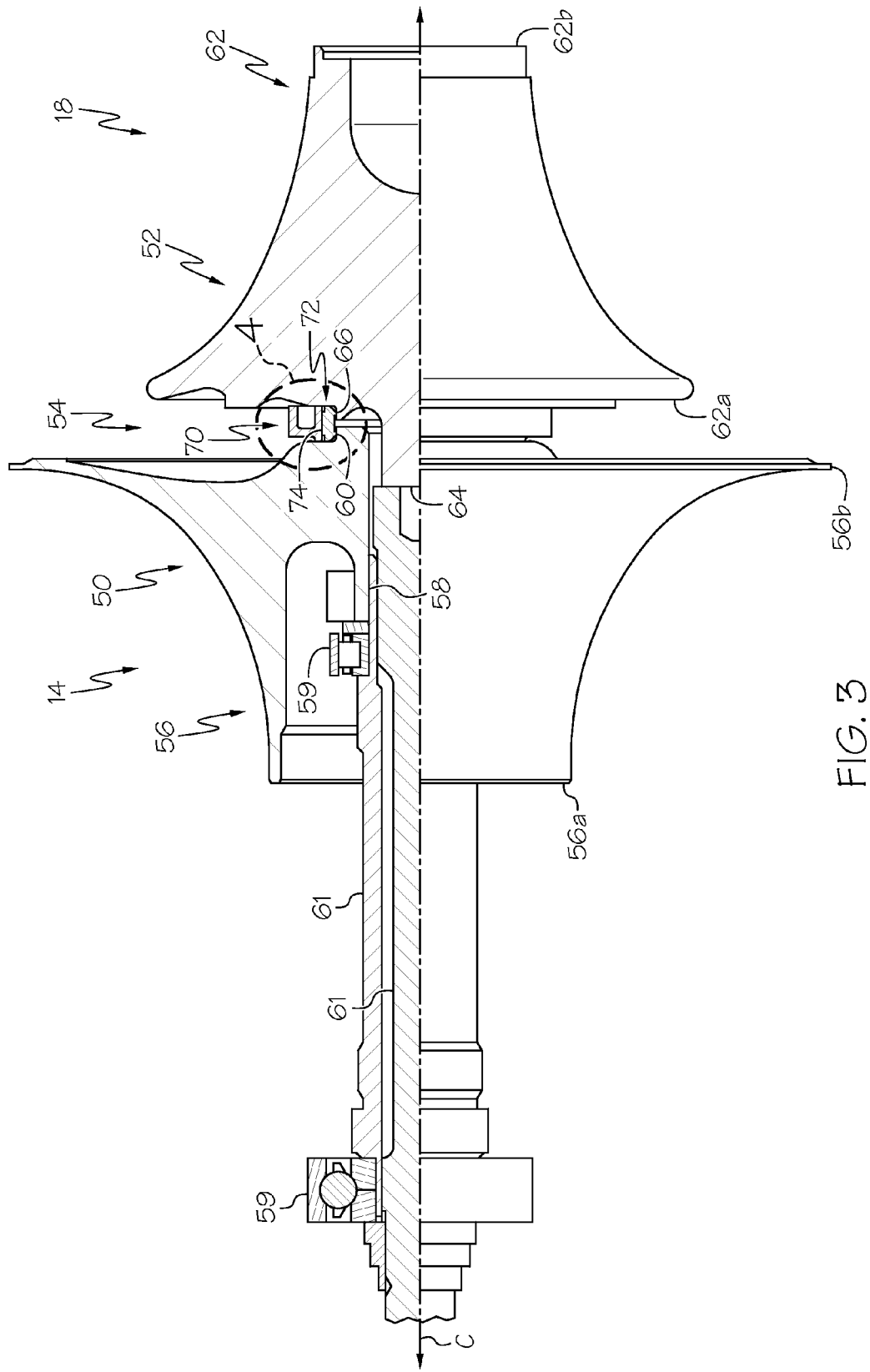
FIG. 3 is a detail cross-sectional view of a portion of the gas turbine engine of FIG. 1, as indicated in FIG. 1, which illustrates the pilot ring.

With reference to FIG. 3, an exemplary portion of the compressor section 14 and the turbine section 18 are shown in greater detail, with intervening components removed. In this example, a first or forward rotor 50 associated with the compressor section 14, such as a portion of the HP compressor 28, and a second or aft rotor 52 associated with the turbine section 18, such as a portion of the high pressure turbine 34, are coupled together via a pilot ring 54. It should be noted that the use of forward and aft refers to the placement of the rotors along the longitudinal centerline axis C of the gas turbine engine 10. In addition, it should be noted that the use of the pilot ring 54 with the forward rotor 50 and the aft rotor 52 is merely exemplary, as the pilot ring 54 can be employed between any two suitable rotating components to provide radial and axial piloting.

The forward rotor 50 includes a body 56, which defines a bore 58. It should be noted that the shape, size and configuration of the forward rotor 50 illustrated and described herein is merely exemplary as the forward rotor 50 can be of any desired shape, size and configuration. In this example, the body 56 of the forward rotor 50 is substantially conical, and can taper from a first end 56a to a second end 56b. While illustrated herein as being substantially solid with a hollow concave portion defined at or near the second end 56b that extends to near the first end 56a, the body 56 can be hollow or can define a central bore, if desired. The second end 56b can include a flange 60. The flange 60 can extend outwardly from the second end 56b such that the flange 60 can substantially surround a perimeter or circumference of the bore 58. In one example, with reference to FIG. 4, the flange 60 can have a width W, which can be sized to be coupled to or receive a portion of the pilot ring 54. Generally, with reference back to FIG. 3, the flange 60 can be spaced or defined a distance from the bore 58 to enable the aft rotor 52 to be rotatably coupled to the forward rotor 50. The bore 58 is defined through the body 56 and is sized to receive at least a portion of the aft rotor 52. The bore 58 is also sized to receive one or more components of the rotating assembly, such as shafts 61, as known to one of skill in the art.

The aft rotor 52 includes a rotor body 62 and defines a shaft 64. It should be noted that the shape, size and configuration of the aft rotor 52 illustrated and described herein is merely exemplary as the aft rotor 52 can be of any desired shape, size and configuration. In this example, the rotor body 62 of the aft rotor 52 is substantially conical, and can taper from a second end 62b to a first end 62a. While illustrated herein as being substantially solid with a hollow concave portion defined at or near the second end 62b, the rotor body 62 can be substantially solid, if desired. The first end 62a can include a flange 66. The flange 66 can extend outwardly from the first end 62a such that the flange 66 can substantially surround a perimeter or circumference of the shaft 64. In one example, with reference to FIG. 4, the flange 66 can have a width W2, which can be sized to be coupled to or receive a portion of the pilot ring 54. Generally, with reference back to FIG. 3, the flange 66 can be spaced a distance from the shaft 64 to enable the shaft 64 to be received in the bore 58 of the forward rotor 50. The shaft 64 extends outwardly from the first end 62a of the rotor body 62. In this example, the shaft 64 is a solid shaft, and generally extends outwardly from the rotor body 62 for a distance suitable to be coupled to the forward rotor 50. The shaft 64 is also coupled to one or more components of the rotating assembly, such as bearings 59 and the shafts 61, as known to one of skill in the art. The shaft 64 applies an axial load on the pilot ring 54 between the forward rotor 50 and the aft rotor 52, and on other components of the rotating assembly.

The pilot ring 54 is coupled about the second end 56b of the forward rotor 50 and the first end 62a of aft rotor 52 and substantially surrounds the shaft 64 of the aft rotor 52. In one example, the pilot ring 54 is a two-piece pilot ring including a first or outer ring 70 and a second or inner ring 72. Generally, the outer ring 70 of the pilot ring 54 accomplishes the axial function of the pilot ring 54 by transferring axial loads between the forward rotor 50 and the aft rotor 52. The inner ring 72 accomplishes the radial function of the pilot ring 54. The aft rotor 52 can be composed of a first material, such as an Inconel alloy, alloy steel, M-50 steel, WASPALOY®, ASTROLOY™, and MAR-M® alloy; and the forward rotor 50 can be composed of a second material, such as an aluminum alloy, titanium alloy and alloy steel. The difference in materials between the forward rotor 50 and the aft rotor 52 can cause the forward rotor 50 to thermally expand at a different rate than the aft rotor 52. The difference in thermal growth rates between the forward rotor 50 and the aft rotor 52 requires the inner ring 72 of the pilot ring 54 to roll axially to accomplish the radial function of the pilot ring 54. As will be discussed further herein, the inner ring 72 of the pilot ring 54 includes one or more features to control the axial roll of the inner ring 72 to improve the radial function of the pilot ring 54. By incorporating the one or more features on the inner ring 72, the two-piece pilot ring 54 can be incorporated between adjacent components without requiring modification of the adjacent rotating components and in place of a single piece or single ring pilot ring.

Generally, the outer ring 70 is disposed circumferentially about the inner ring 72 such that the outer ring 70 is substantially concentric with the inner ring 72 about the longitudinal centerline axis C. In this example, the outer ring 70 can be positioned about the outer ring 70 such that a clearance gap 74 is defined between the outer ring 70 and the inner ring 72. Thus, the outer ring 70 can have a diameter that is greater than a diameter of the inner ring 72 in order to define the clearance gap 74. Generally, the clearance gap 74 is sized to enable the inner ring 72 to rotate relative to the outer ring 70. In one example, the clearance gap 74 can be about 0.025 inches (in.) to about 0.50 inches (in.).

Figure 4:
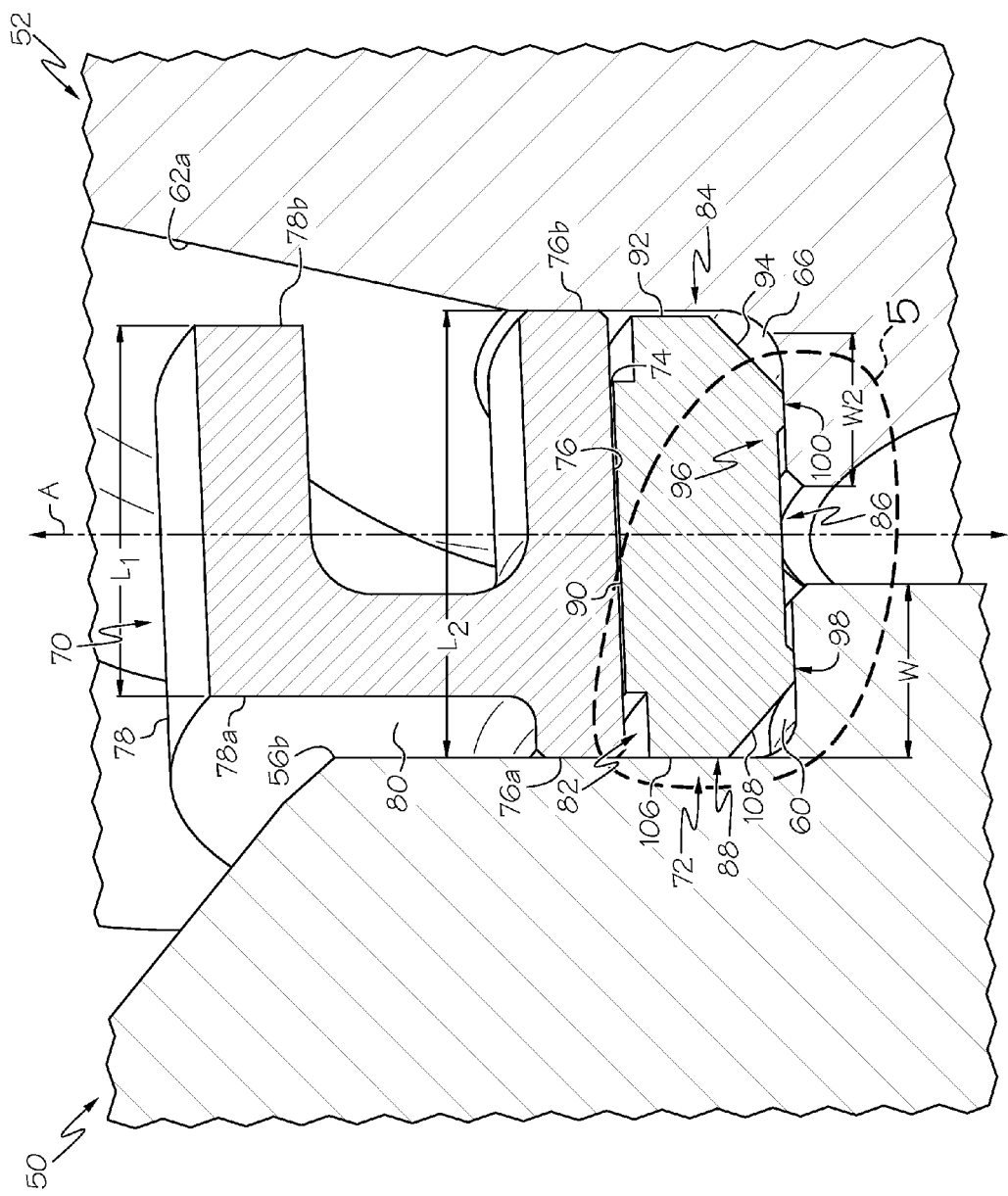
FIG. 4 is a detail cross-sectional view of a portion of the gas turbine engine of FIG. 3, as indicated in FIG. 3.

With reference to FIG. 4, the outer ring 70 can be generally comprised of a suitable metal or metal alloy, and in one example, is comprised of an Inconel alloy, alloy steel, MAR-M® alloy or any other suitable high strength alloy. The outer ring 70 includes a first, inner peripheral or circumferential surface 76 and a second, outer peripheral or circumferential surface 78, which can be coupled together or interconnected via an extension 80. The inner circumferential surface 76 can be substantially smooth or uniform, and includes a first end 76a spaced apart from a second end 76b. The first end 76a can be coupled to and adjacent to the second end 56b of the forward rotor 50 and the second end 76b can be coupled to and adjacent to the first end 62a of the aft rotor 52 to transfer axial loads between the forward rotor 50 and the aft rotor 52 through the outer ring 70.

The outer circumferential surface 78 can be substantially smooth or uniform and can contact a seal, such as a brush seal, as known to those skilled in the art. The outer circumferential surface 78 includes a first end 78a and a second end 78b. The first end 78a can be coupled to and adjacent to the second end 56b of the forward rotor 50, and the second end 78b can be near the first end 62a of the aft rotor 52. Stated another way, the outer circumferential surface 78 can have a length L1, which can be less than a length L2 of the inner circumferential surface 76. The extension 80 can extend radially outward from the inner circumferential surface 76 to couple the inner circumferential surface 76 to the outer circumferential surface 78. Generally, the extension 80 extends radially outwardly from the inner circumferential surface 76 near the second end 76b so as to extend along an axis offset from a central axis A, which extends through the pilot ring 54.

The inner ring 72 can be generally comprised of a suitable metal or metal alloy, and in one example, is comprised of an Inconel alloy, alloy steel or any other suitable high strength material. The inner ring 72 includes a first side 82, a second side 84, a third side 86 and a fourth side 88. Generally, the inner ring 72 is symmetric with respect to the central axis A, however, the inner ring 72 can be asymmetric relative to the central axis A, if desired. In this example, the first side 82 comprises an outer circumferential surface of the inner ring 72 and is substantially opposite the third side 86, which comprises an inner circumferential surface of the inner ring 72. The second side 84 is substantially opposite the fourth side 88. The first side 82 can be adjacent to the outer ring 70 and spaced from the outer ring 70 via the clearance gap 74. The first side 82 can include a raised surface 90, which can extend radially outward from the first side 82 into the clearance gap 74. The second side 84 can include a planar surface 92 and an angled or inclined surface 94. The planar surface 92 can extend from the first side 82 to the inclined surface 94. The planar surface 92 can be substantially parallel to the first end 62a of the aft rotor 52 for alignment of the inner ring 72 with the aft rotor 52, but can be spaced axially away from the first end 62a of the aft rotor 52 to enable the rotation of the inner ring 72 relative to the aft rotor 52. The inclined surface 94 extends from the planar surface 92 to the third side 86. Generally, the inclined surface 94 extends at an angle of about negative 115 degrees to negative 135 degrees relative to the planar surface 92. The inclined surface 94 reduces the surface area of the third side 86, thereby reducing the resistance of the inner ring 72 to move or roll. The inclined surface 94 can comprise a chamfer that is larger than a radius of the flange 66 of the aft rotor 52. In one example, if the radius of the flange 66 of the aft rotor 52 is about 0.40 inches (in.), the inclined surface 94 would be sized to clear the flange 66 of the aft rotor 52 to enable the inner ring 72 to rotate.

The third side 86 comprises the inner circumference of the inner ring 72 and includes one or more roll features 96. The one or more roll features 96 allow the inner ring 72 to roll axially relative to the forward rotor 50 and the aft rotor 52 to accomplish the radial function of the pilot ring 54. In one example, the one or more roll features 96 comprise a first protrusion 98 and a second protrusion 100. In one example, the first protrusion 98 is adjacent to the fourth side 88 to be coupled to and in contact with the flange 60 of the forward rotor 50, and the second protrusion 100 is adjacent to the inclined surface 94 of the second side 84 to be coupled to and in contact with the flange 66 of the aft rotor 52. The first protrusion 98 is spaced apart from the second protrusion 100 along the diameter of the inner ring 72. The first protrusion 98 and the second protrusion 100 each extends substantially along a perimeter of the inner circumference or third side 86 of the inner ring 72. The first protrusion 98 and the second protrusion 100 can generally be formed along the third side 86 so as to be spaced between about 38 percent to about 100 percent from the central axis A along the third side 86, respectively. Stated another way, the first protrusion 98 and the second protrusion 100 can each be formed to be about 38 percent or 100 percent spaced apart from a midline or the central axis A defined through the pilot ring 54. In the example of FIG. 4, the first protrusion 98 and the second protrusion 100 are formed to be about 100 percent spaced apart from the central axis A along the third side 86. The positioning of the first protrusion 98 and the second protrusion 100 offset from the central axis A of the pilot ring 54 ensures that the first protrusion 98 and the second protrusion 100 engage the respective one of the flange 60 and the flange 66 for rotation to accomplish the radial function of the pilot ring 54.

Generally, the first protrusion 98 and the second protrusion 100 extend radially inward from the third side 86 and are sized to create an interference fit between the inner ring 72, the forward rotor 50 and the aft rotor 52. Stated another way, the first protrusion 98 and the second protrusion 100 extend radially inward from the inner diameter of the inner ring 72 towards a center of the inner ring 72. The first protrusion 98 extends radially inward from the third side 86 such that the third side 86 does not contact the flange 60 as the inner ring 72 rolls relative to the first protrusion 98, and the second protrusion 100 extends radially inward from the third side 86 such that the third side 86 does not contact the flange 66 as the inner ring 72 rolls relative to the second protrusion 100. In one example, the first protrusion 98 and the second protrusion have an offset relative to or from the third side 86 of about 0.20 inches (in.) to about 5.0 inches (in.), and the first protrusion 98 and the second protrusion have a width of about 0.5 inches (in.) to about 2.0 inches (in.). Stated another way, the first protrusion 98 and the second protrusion can extend radially inward from the third side 86 about 0.20 inches (in.) to about 5.0 inches (in.).

Figure 5:
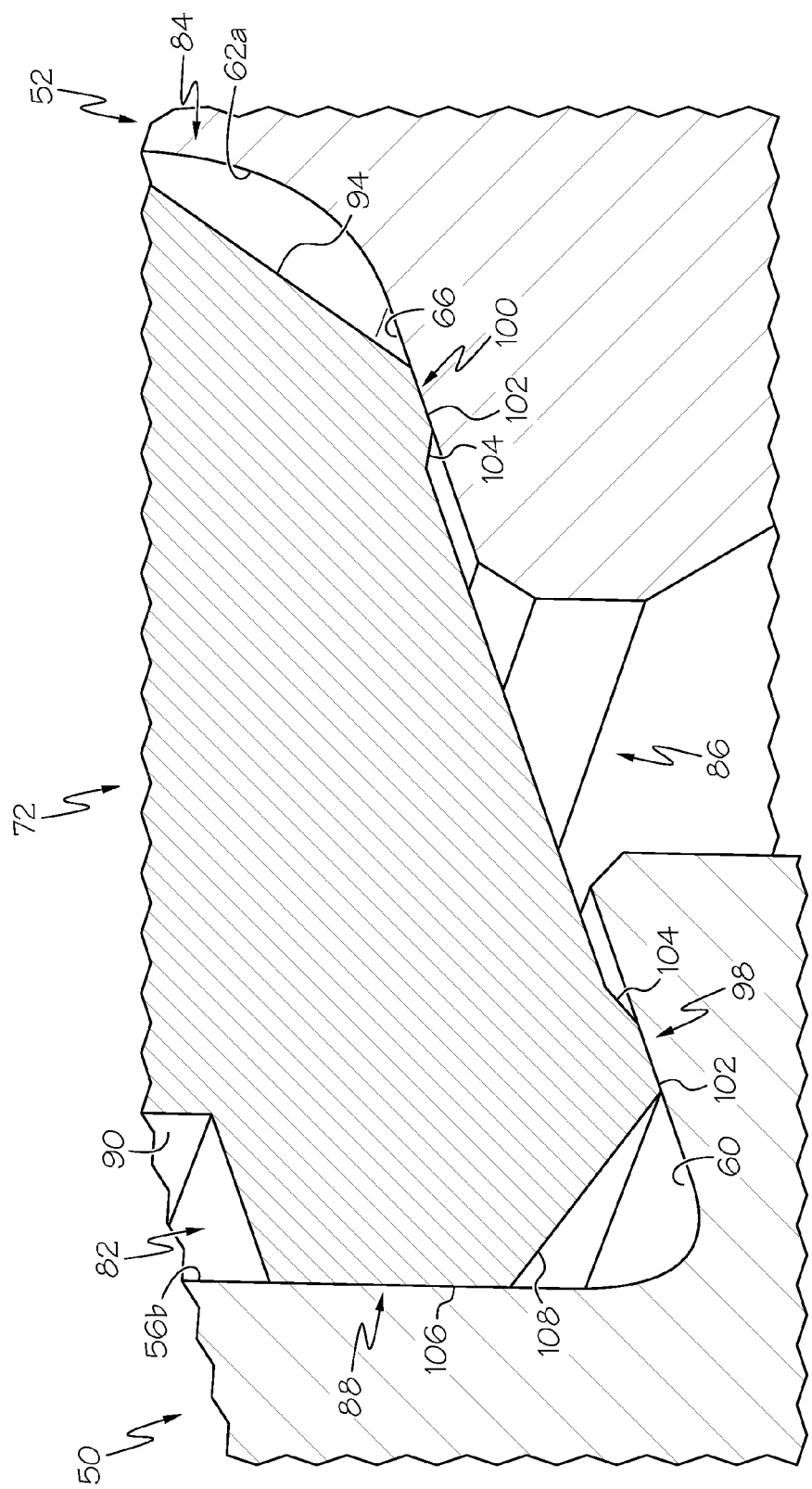
FIG. 5 is a further detail cross-sectional view of a portion of the gas turbine engine of FIG. 4, as indicated in FIG. 4.

The first protrusion 98 and the second protrusion 100 can have any desired cross-section to provide an axial location for circumferential contact for the axial roll of the inner ring 72 relative to the forward rotor 50 and the aft rotor 52 to accomplish the radial function of the pilot ring 54. In one example, with reference to FIG. 5, the first protrusion 98 and the second protrusion 100 can comprise a planar or flat surface 102 with an inward facing chamfered edge 104 that extends radially inward from the third side 86, but the surface 102 of the first protrusion 98 and the second protrusion 100 can be rounded or arcuate (e.g. the first protrusion 98 and the second protrusion 100 can comprise bumps). The surface 102 can comprise the width of the first protrusion 98 and the second protrusion 100, and in one example, as discussed above, the first protrusion 98 and the second protrusion 100 have a width of about 0.5 inches (in.) to about 2.0 inches (in.). In addition, the surface 102 of the first protrusion 98 and the second protrusion 100 can have a triangular shape. Thus, the surface 102 of the first protrusion 98 and the second protrusion 100 can comprise any suitable shape and dimension to provide an axial location for circumferential contact for the axial rolling of the inner ring 72 relative to the forward rotor 50 and the aft rotor 52 to accomplish the radial function of the pilot ring 54. Stated another way, the surface 102 of the first protrusion 98 and the second protrusion 100 comprise any suitable shape or geometric feature that offsets the inner diameter or third side 86 of the inner ring 72 relative to the flange 60 of the forward rotor 50 and flange 66 of the aft rotor 52 to enable the inner ring 72 to roll axially relative to the forward rotor 50 and the aft rotor 52. Moreover, the surface 102 of the first protrusion 98 and the second protrusion 100 need not be of the same shape, but rather, the surface 102 of the first protrusion 98 can have a different shape than the surface 102 of the second protrusion 100. Further, the first protrusion 98 and the second protrusion 100 can extend radially inward from the third side 86 at different dimensions to accommodate different sized flanges.

Figure 6:
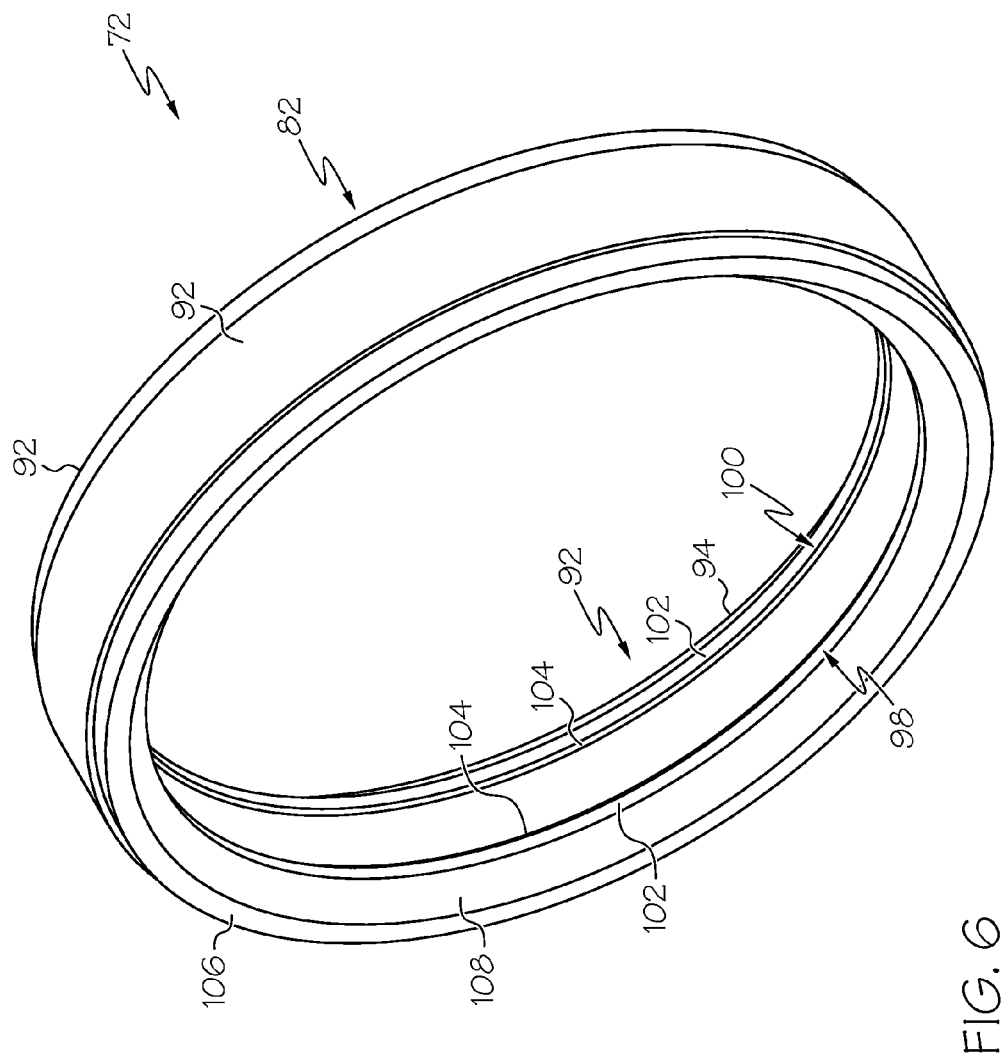
FIG. 6 is a perspective view of an inner ring of the pilot ring in accordance with various embodiments.

Generally, with reference to FIG. 6, the first protrusion 98 and the second protrusion 100 can be machined onto the third side 86 of the inner ring 72 so as to extend about the inner circumference of the inner ring 72, however, the first protrusion 98 and the second protrusion 100 can be coupled to the inner ring 72 via any suitable technique, such as integral forming, welding, casting, etc. In addition, although the inner ring 72 is described and illustrated herein as including two roll features 96, the inner ring 72 can include a single roll feature 96, if desired.

With reference to FIG. 4, the fourth side 88 includes a planar surface 106 and an angled or inclined surface 108. The planar surface 106 can extend from the first side 82 to the inclined surface 108. The planar surface 106 can be substantially parallel to the first end 56a of the forward rotor 50 for alignment of the inner ring 72 with the forward rotor 50, but can be spaced axially away from the second end 56b of the forward rotor 50 to enable the rotation of the inner ring 72 relative to the forward rotor 50. The inclined surface 108 extends from the planar surface 106 to the third side 86. Generally, the inclined surface 108 extends at an angle of about 295 degrees to 315 degrees relative to the planar surface 106. The inclined surface 108 reduces the surface area of the third side 86, thereby reducing the resistance of the inner ring 72 to move or roll axially to accomplish the radial function of the pilot ring 54. The inclined surface 108 can comprise a chamfer that is larger than a radius of the flange 60 of the forward rotor 50. In one example, if the radius of the flange 60 of the forward rotor 50 is about 0.40 inches (in.), the inclined surface 108 would be sized to clear the flange 60 of the forward rotor 50 to enable the inner ring 72 to rotate.

With the one or more roll features 96 defined on the inner circumference or third surface 86 of the inner ring 72, in order to assemble the pilot ring 54, the outer ring 70 is coupled to the inner ring 72 such that the clearance gap 74 is defined. With the pilot ring 54 assembled, in one example, pilot ring 54 can be coupled to the forward rotor 50, such that the first protrusion 98 is fitted onto the flange 60. Then, the shaft 64 of the aft rotor 52 can be received in the bore 58 of the forward rotor 50 and coupled together such that the second protrusion 100 is fitted onto the flange 66. Generally, the pilot ring 54 is coupled to the forward rotor 50 and the aft rotor 52 with the interference fit between the first protrusion 98 and the flange 60, and the second protrusion 100 and the flange 66.

During the rotation of the forward rotor 50 and the aft rotor 52, the outer ring 70 transfers the axial loads between the forward rotor 50 and the aft rotor 52, thereby decoupling the axial function of the pilot ring 54 from the inner ring 72. As the forward rotor 50 and the aft rotor 52 thermally expand at different rates, the inner ring 72 performs the radial function of the pilot ring 54 by moving or rolling axially about the longitudinal centerline axis C of the assembled forward rotor 50 and aft rotor 52. The use of the one or more roll features 96 of the inner ring 72 enable the axial roll of the inner ring 72 to be controlled by the inner ring 72 and not by the forward rotor 50 and the aft rotor 52. By controlling the axial roll of the inner ring 72 with the one or more roll features 96, the pilot ring 54 can replace single piece or single ring pilot rings without requiring modifications to the adjacent components. Furthermore, the radial extension of the one or more roll features 96 from the inner circumference or third side 86 of the inner ring 72 can be easily adjusted to allow the inner ring 72 to form an interference fit with a number of differently sized adjacent components.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A pilot ring, comprising:
a first ring; and
a second ring positioned concentrically within the first ring, the second ring including a first circumferential surface positioned adjacent to the first ring and a second circumferential surface opposite the first circumferential surface, the second circumferential surface including at least one roll feature that extends substantially along a perimeter of the second circumferential surface,
wherein the at least one roll feature extends radially inward from the second circumferential surface.

2. The pilot ring of claim 1, wherein the at least one roll feature comprises a first protrusion spaced apart from a second protrusion along the second circumferential surface.

3. The pilot ring of claim 2, wherein the pilot ring defines a central axis through the pilot ring, and the first protrusion and the second protrusion are defined along the second circumferential surface so as to be offset from the central axis.

4. The pilot ring of claim 1, wherein the at least one roll feature includes a surface that defines an axial location for circumferential contact.

5. The pilot ring of claim 4, wherein the surface is planar.

6. The pilot ring of claim 1, wherein the second ring is spaced apart from the first ring to define a clearance gap.

7. The pilot ring of claim 1, wherein the second ring is symmetrical with respect to a central axis defined through the pilot ring.

8. A pilot ring, comprising:
a first ring; and
a second ring positioned within the first ring and spaced apart from the first ring to define a clearance gap, the second ring including a first side spaced apart from the first ring by the clearance gap and a second side opposite the first side, the first side coupled to the second side by a third side and a fourth side, the third side and the fourth side each including a planar surface and an inclined surface such that the second ring is symmetrical relative to a central axis defined through the pilot ring, and the second side including at least one roll feature that extends radially inward from the third side.

9. The pilot ring of claim 8, wherein the at least one roll feature comprises a first protrusion spaced apart from a second protrusion along the third side.

10. The pilot ring of claim 9, wherein the first protrusion and the second protrusion are defined along the third side so as to be offset from the central axis.

11. The pilot ring of claim 9, wherein the first protrusion and the second protrusion are defined along the third side so as to be spaced a substantially equal distance from the central axis.

12. The pilot ring of claim 8, wherein the at least one roll feature includes a surface that defines an axial location for circumferential contact.

13. The pilot ring of claim 12, wherein the surface is planar.

14. A gas turbine engine, comprising:
a first component having a first flange;
a second component coupled to the first component to rotate with the first component, the second component including a second flange; and
a pilot ring coupled to the first flange and the second flange, the pilot ring including a first ring spaced apart from a second ring, the first ring to transfer axial loads between the first component and the second component, the second ring including a first roll feature and a second roll feature defined on a first circumferential surface of the second ring, the first roll feature and the second roll feature extending radially inward from the first circumferential surface, with the first roll feature coupled to the first flange of the first component and the second roll feature coupled to the second flange of the second component to provide radial piloting of the first component and the second component.

15. The gas turbine engine of claim 14, wherein the first roll feature and the second roll feature each include a surface that defines an axial location for circumferential contact.

16. The gas turbine engine of claim 15, wherein the surface is planar.

17. The gas turbine engine of claim 14, wherein the second ring is spaced apart from the first ring to define a clearance gap.

18. The gas turbine engine of claim 14, the first roll feature and the second roll feature are defined along the first circumferential surface so as to be offset from a central axis defined through the pilot ring.

19. The gas turbine engine of claim 14, wherein the first roll feature and the second roll feature are defined along the first circumferential surface so as to be spaced a substantially equal distance from a central axis defined through the pilot ring.

* * * * *